United States Patent [19]

Epstein et al.

[11] 4,048,401
[45] Sept. 13, 1977

[54] HERMETICALLY SEALED PRIMARY ELECTROCHEMICAL CELL AND A METHOD FOR ITS PRODUCTION

[75] Inventors: James Epstein, Sharon; Arthur Y. Chin, Pinehurst, both of Mass.

[73] Assignee: GTE Laboratories Incorporated, Waltham, Mass.

[21] Appl. No.: 647,396

[22] Filed: Jan. 8, 1976

Related U.S. Application Data

[63] Continuation-in-part of Ser. No. 539,752, Jan. 9, 1975, abandoned.

[51] Int. Cl.² .............................................. H01M 2/02
[52] U.S. Cl. .................................... 429/171; 429/174; 429/180
[58] Field of Search ................. 136/133, 100 R, 83 R, 136/6 R; 429/171, 174, 180, 181, 185

[56] References Cited

U.S. PATENT DOCUMENTS

| 3,064,065 | 11/1962 | Belove | 136/133 X |
|---|---|---|---|
| 3,237,060 | 2/1966 | Ross | 136/133 X |
| 3,420,714 | 1/1969 | Knight | 136/133 X |
| 3,544,383 | 12/1970 | Oltman | 136/133 |
| 3,804,671 | 4/1974 | Rosansky | 136/133 X |
| 3,843,413 | 10/1974 | Schmidt | 136/121 X |
| 3,874,929 | 4/1975 | Greatback | 136/100 R X |

*Primary Examiner*—C. F. Lefevour
*Attorney, Agent, or Firm*—Irving M. Kriegsman; Robert A. Seldon

[57] ABSTRACT

A hermetically sealed primary electrochemical cell is described together with a method for its production which is especially useful with electrochemical systems which include an electrolytic solution having a volatile solvent material. The hermetic seal is achieved by welding a glass-to-metal seal within a single opening in the outer casing of the primary electrochemical cell. In order to avoid volatilization of the solvent material during the welding process, a temporary seal is formed within the outer cell casing immediately above the elements forming the electrochemical system so the solvent material is insulated from the heat and any volatilized solvent material is effectively prevented from escaping during the time required to complete the weld. In a preferred form of the method, the entire assembly is chilled prior to the welding step to further reduce volatilization of the solvent material.

9 Claims, 1 Drawing Figure

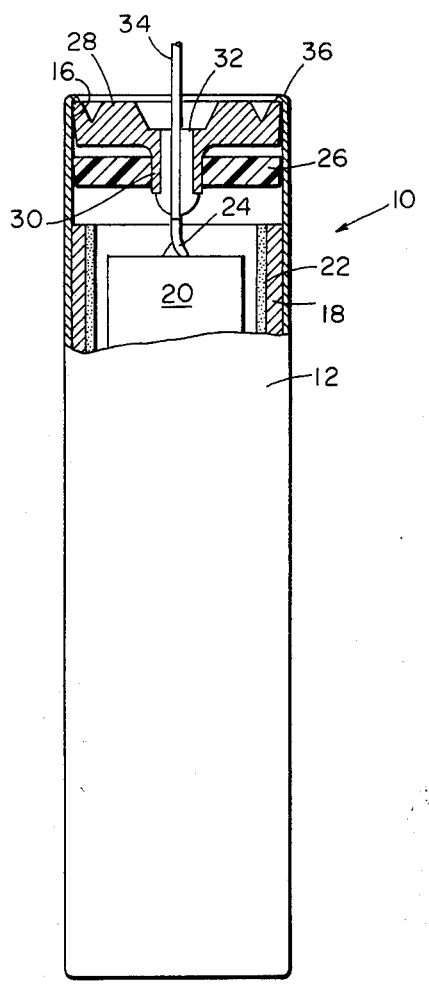

HERMETICALLY SEALED PRIMARY ELECTROCHEMICAL CELL AND A METHOD FOR ITS PRODUCTION

CROSS-REFERENCE TO RELATED PATENT APPLICATION

This patent application, is a continuation-in-part of application Ser. No. 539,752, filed Jan. 9, 1975, and assigned to the same assignee as in the present patent application, now abandoned.

BACKGROUND OF THE INVENTION

The present invention is related generally to primary electrochemical cells and is more particularly concerned with a novel primary electrochemical cell which is hermetically sealed and a method for its production.

Primary electrochemical cells have been known for some time and have been utilized in a wide variety of applications. Certain of these applications require that the cell be hermetically sealed in order to preclude the possibility of any of the contents escaping into the surrounding environment. Two such applications are where the cell is used in a vacuum such as in space installations and where the cell is used in a device which is implanted within the human body, such as a heart pacer. In both of these classes of applications, reliability of the primary electrochemical cells is extremely important. This reliability includes protection against leakage of the contained electrolytic solution.

Previously, the technique which has been utilized to form a hermetically sealed primary electriochemical cell has involved the emplacement of a tubular feedthrough in either a wall of the cell container or in a glass-to-metal seal utilized at the closure of the cell container. This technique has a number of significant disadvantages. Firstly, the simple mechanics of filling the primary electrochemical cell with the electrolytic solution through a small opening such as is present in such a feedthrough device requires the initial evacuation of the container followed by backfilling with the electrolytic solution. This is time consuming and each container must be weighed individually in order to determine if the proper amount of electrolytic solution has been added. Furthermore, contamination of the feedthrough tubing during the filling process necessarily takes place and makes it difficult and often impossible to achieve a hermetic seal in that tubing to finally close off the container.

SUMMARY OF THE INVENTION

Accordingly, it is an object of the present invention to provide a novel hermetically sealed primary electrochemical cell which is simple in construction and capable of achieving high reliability in the hermetic seal.

It is a second object of the invention to provide a method for the production of such a hermetically sealed primary electrochemical cell.

In its broadest aspect, the present invention comprises a hermetically sealed primary electrochemical cell. The primary electrochemical cell has a hollow outer cell casing having a single opening therein. The outer cell casing is formed of a conductive material and is a first terminal of the primary electrochemical cell. An electrochemical system is disposed within the outer cell casing and includes an anode in mechanical and electrical contact with the outer cell casing, a cathode spaced from the anode, and a liquid electrolytic solution (including a relatively volatile solvent and a solute dissolved therein) in contact with the anode and cathode materials. A separator is interposed between the anode and cathode to prevent physical contact there-between. A glass-to-metal seal is welded into the opening in the outer cell casing to seal hermetically the primary electrochemical cell. The glass-to-metal seal has a metallic feedthrough in the central portion thereof, the internal end of which engages the cathode thereby serving as a current collector therefor. The external end of the metallic feedthrough serves as a second terminal of the primary electrochemical cell. Finally, means are provided for establishing a temporary seal within the outer cell casing above the electrochemical system whereby escape of any volatilized solvent during the welding of the glass-to-metal seal is generally prevented.

The invention also includes a method of producing a hermetically sealed primary electrochemical cell. That method comprises the following series of steps. An electrically conductive hollow outer casing is formed and has a single opening therein. An anode of a material for use in a selected electrochemical system is placed within the outer casing in mechanical and electrical contact with the outer casing so that the outer casing may form one terminal of the primary electrochemical cell. A cathode of a material for use in the selected electrochemical system and a separator are placed within the outer casing so that physical contact between the anode and cathode materials is prevented. The outer cell casing is filled with an effective amount of a liquid electrolytic solution compatible with the selected electrochemical system. A glass-to-metal seal is inserted into the opening in the outer casing. The glass-to-metal seal has a solid metallic feedthrough in the center thereof which engages the cathode upon insertion and which serves as a current collector therefor. A temporary seal is established within the outer cell casing above the electrochemical system whereby escape of any volatilized solvent is generally prevented. The glass-to-metal seal is then welded to the outer casing to form a hermetically sealed primary electrochemical cell.

The term "temporary" in the phrase "temporary seal" is used to distinguish the nature of this seal from that of the hermetic (i.e., permanent) seal subsequently formed by the welding operation. As is known in the art, a confined gas eventually permeates any non-hermetic seal. Thus, a non-hermetic seal is ultimately a temporary seal. The temporary seal of the presently described electrochemical cell must effectively seal only temporarily; that is until completion of the welding operation which forms the hermetic seal.

Further objects, advantages, and features of the invention will be apparent from the following detailed description of the preferred embodiments taken together with the accompanying drawing.

BRIEF DESCRIPTION OF THE DRAWING

In the drawing;

the sole FIGURE is a side elevation view of a primary electrochemical cell according to the present invention which is shown partially in section.

BRIEF DESCRIPTION OF THE PREFERRED EMNBODIMENTS

Referring to the drawing, there is shown a hermetically sealed primary electrochemical cell according to the invention which is designated generally by the reference numeral 10. The primary electrochemical cell 10 is housed within a hollow outer cell casing 12. The outer cell casing 12 is closed at one end 14 thereof and open at the other end 16. The opening at the end 16 is the only opening in the outer cell casing. The outer cell casing 12 is formed of a conductive material so that it may serve as a first terminal of the primary electrochemical cell.

An electrochemical system is disposed within the outer cell casing 12 and includes an anode 18, a cathode 20 and an electrolytic solution (not shown) in contact with both the anode and cathode. The electrolytic solution includes a liquid oxyhalide solvent material and a solute dissolved therein to make the solution ionically conductive. Suitable oxyhalide solvents include those of phosphorus or sulfur, such as phosphorus oxychloride, thionyl chloride, sulfuryl chloride, or mixtures thereof. Such oxyhalide solvent materials additionally function as liquid depolarizers as they are electrochemically reduced on the surface of the cathode material during operation of the cell. Suitable electrochemical systems (i.e., anode, cathode and electrolytic solution materials) are set forth in copending applications Ser. Nos. 492,316, filed 7/26/74, now abandoned and 517,557, filed 10/24/74, now issued as U.S. Pat. No. 3,923,543 the disclosures of which are incorporated herein by reference. The anode 18 is disposed generally in mechanical and electrical contact with the outer cell casing 12 over a major portion of the length of the outer cell casing 12 and completely around the internal circumference thereof. The cathode 20 is located generally in the center of the outer cell casing 12 and is separated from the anode by a porous separator 22. The separator is utilized simply to prevent physical contact between the anode and cathode which would cause intracellular shorting and premature failure of the cell. The separator 22 is generally an inert porous material, such as a glass fiber paper.

In this embodiment, a cathode current collector 24 is impressed into the cathode 20 over a major portion of its length. The cathode current collector 24 is preferably a tortuously formed strip of conductive material and is described more completely in a copending patent application entitled "Primary Electrochemical Cell and Improved Cathode Current Collector Therefor", now assigned Ser. No. 539,750 and abandoned, which is being filed concurrently herewith by F. Goebel and N. Marincic, which application is also assigned to the assignee of the instant application.

A plastic washer 26 is disposed above the electrochemical materials in sealing contact with the internal wall of the outer cell casing 12. Above the plastic washer 26, a glass-to-metal seal 28 protrudes inwardly toward the electrochemical materials and engages the hole in the plastic washer 26 so as to form a complete temporary seal across the cell casing immediately above the electrochemical materials. Within the central portion 30, a glass sleeve 32 is located through which a solid metallic feedthrough 34 extends. The internal end of the metallic feedthrough 34 mechanically and electrically engages the cathode current collector 24. The external end of the metallic feedthrough 34 serves as a second terminal for the primary electrochemical cell 10. A weld is formed at the rim 36 where the glass-to-metal seal engages the opening 16 in the outer cell casing 12.

The present invention is of significant utility with any type of primary electrochemical cell which utilizes a liquid solvent material which is capable of being volatilized relatively easily. The invention has particular utility in a recently developed class of primary electrochemical cells where a lithium or other alkali metal anode is utilized with liquid depolarizers which can be reduced electrochemically on a high surface area carbon cathode (see application Ser. No. 492,316) or a $(C_4F)_n$ cathode (see application Ser. No. 517,557 now issued as U.S. Pat. No. 3,923,543).

In this class of cells, the preferred anode material is lithium and the liquid depolarizers are as set forth above (i.e., they are preferably chosen from the group consisting of phosphorus oxychloride, thionyl chloride,, sulfuryl chloride, and mixtures thereof).

In producing the hermetically sealed primary electrochemical cells of the present invention, the outer casing is formed initially so as to have a single opening therein. When a cylindrical form such as shown in the figure of the drawing is utilized, the simplest way of achieving this requirement is that one end of the cylinder be closed during the formation of the outer cell casing while the other end is left open.

The anode of the particular electrochemical system chosen is placed within the outer cell casing 12 and in mechanical and electrical contact with the outer cell casing. In the case of the lithium anode, this is achieved by inserting a rolled piece of lithium within the outer cell container, after which the lithium is rolled into intimate contact with the outer cell casing. A bond sufficient for the present purposes is achieved thereby between the lithium anode and outer cell casing.

The cathode and a porous separator are next placed within the outer casing such that the separator prevents physical contact between the anode and cathode materials. A preferred form of cathode for use in the lithium type primary electrochemical cells is a porous preformed carbon cathode which is described in a copending patent application entitled "A Primary Electrochemical Cell and a Preformed Cathode Therefor," by F. Goebel and W. P. Brissette, assigned Ser. No. 539,748 and now abandoned, which is assigned to the assignee of the instant application. The separator is a porous nonconducting material such as glass fiber paper.

In the presently preferred embodiment, a plastic washer 26 is next pressed into place within the opening 16 in the outer cell casing 12 to a point above the electrochemical cell materials. This washer 26 forms a temporary seal with the internal wall of the casing. The electrolytic solution is then placed in the cell by pouring the proper amount through the washer into the cell. The washer forms a gauge for accurately determining the amount of electrolytic solution poured into the cell since the lower edge of the washer is close to the top of the electrochemical materials. Thereafter, the glass-to-metal seal 28 is pressed into the opening 16 so that the rims 36 thereof are matched together. The bottom surface of the glass-to-metal seal engages the hole in the ring washer 26 so as to bear against the edge thereof and complete a temporary seal within the outer cell casing above the electrochemical materials. Thereafter, welding of the rims 36 may take place without danger of the escape of a significant amount of the electrolytic solution from within the cell.

Of course, various of the foregoing steps may be performed in an order different from that expressed above. For example, the filling of the electrolytic solution into the cell may occur prior to the insertion of the means by which a seal is established with the interior wall of the outer cell casing 12.

The volatilization of the electrolytic solution during the welding process may be further significantly reduced by chilling the entire assembly prior to the welding.

The presently preferred material for the temporary seal 26 is a fluorocarbon polymer such as is commercially available under the tradenames Teflon and Kel-F. Teflon is a registered trademark of E. I. du Pont de Nemours and Company for tetrafluoroethylene fluorocarbon polymers and fluorinated ethylenepropylene resins. Kel-F is a registered trademark of the 3M Company for a series of fluorocarbon products including polymers of chlorotrifluoroethylene and certain co-polymers.

While the presently preferred form for the temporary seal is a ring type washer as shown in the drawing, it is included within the purview of the invention that other forms of temporary seal may be utilized which fulfill the requirement of completing a temporary seal above the electrochemical materials upon the insertion of the glass-to-metal seal into the outer cell casing.

While there have been shown and described hereinabove what are considered to be the currently preferred embodiments of the present invention, it will be obvious to those of ordinary skill in the art to which the invention pertains that various changes and modifications may be made therein without departing from the spirit of the invention as defined in the appended claims.

We claim:

1. A hermetically sealed primary electrochemical cell comprising:
   a hollow outer cell casing having a single opening therein, the outer cell casing being formed of a conductive material and being a first terminal of the primary electrochemical cell;
   an electrochemical system being disposed within the outer casing and including
      an anode in mechanical and electrical contact with the outer cell casing,
      a cathode spaced from the anode material, and
      a liquid electrolytic solution in contact with the anode and cathode, said electrolytic solution including a solvent and a solute dissolved therein,
      an electrically, non-conductive separator being interposed between the anode and cathode;
   a glass-to-metal seal being welded into the opening in the outer cell casing to seal hermetically the primary electrochemical cell, the glass-to-metal seal having a metallic feedthrough in the central portion thereof the internal end of which engages the cathode thereby serving as a current collector therefor, the external end serving as a second terminal of the primary elecytrochemical cell, and
   means for establishing a temporary seal within the outer cell casing between the weld and the electrochemical system, whereby escape of any volatilized solvent during welding of the glass-to-metal seal is generally prevented.

2. A hermetically sealed primary electrochemical cell according to claim 1, wherein there is further included means for partially thermally insulating the electrolytic solution from heat generated while welding the glass-to-metal seal in the opening in the outer cell casing.

3. A hermetically sealed primary electrochemical cell according to claim 1, wherein the cathode is a preformed porous carbon cathode.

4. A hermetically sealed primary electrochemical cell according to claim 1, wherein a cathode current collector is attached to the internal end of the metallic feedthrough, the cathode current collector being a tortuously formed strip of conductive material a major portion of which extends into the preformed porous carbon cathode.

5. A hermeticaly sealed primary electrochemical cell according to claim 2, wherein the means for establishing a temporary seal and the means for partially thermally insulating the electrolytic solution are a plastic washer which is press fitted within the outer cell casing above the electrochemical system and which has a central opening therein the edge of which bears against the glass-to-metal seal to complete the temporary seal.

6. A hermetically sealed primary electrochemical cell according to claim 5, wherein the plastic washer is formed of a fluorocarbon polymer.

7. A method of producing a hermetically sealed primary electrochemical cell comprising the steps of:
   forming an electrically conductive hollow outer casing having a single opening therein;
   placing an anode of a selected electrochemical system within the outer casing and in mechanical and electrical contact with the outer casing so that the outer casing forms one terminal of the primary electrochemical cell;
   placing a cathode of the selected electrochemical system and a separator of non-conducting material within the outer casing so that physical contact between the anode and cathode materials is prevented;
   filling the outer casing with an effective amount of an electrolytic solution compatible with the selected electrochemical system, said electrolytic solution including a solvent and a solute dissolved therein;
   placing a layer of barrier material in sealing contact with the inner wall of the casing to temporarily seal the electrolytic solution from the casing opening;
   inserting a glass-to-metal seal into the opening in the outer casing, the glass-to-metal seal having a solid metallic feedthrough in the central portion thereof which engages the cathode material upon insertion and which serves as a current collector therefor; and
   welding the glass-to-metal seal to the outer casing to form a hermetic seal, the temporary seal generally preventing volatilization of electrolyte during the welding step.

8. A method according to claim 7, wherein the primary electrochemical cell assembly is chilled prior to welding to reduce the vapor pressure of the electrolytic solution.

9. A method according to claim 8, wherein the temporary seal is established by pressing a plastic washer into the opening in the outer casing prior to insertion of the glass-to-metal seal so that upon insertion of the glass-to-metal seal a portion thereof bears against the washer to complete the temporary seal.

* * * * *